United States Patent [19]
Wietelmann et al.

[11] Patent Number: 5,211,712
[45] Date of Patent: May 18, 1993

[54] AUTOMATIC CONTROL SYSTEM FOR A FRICTION-ENCUMBERED SIGNALING DEVICE IN A MOTOR VEHICLE

[75] Inventors: Jürgen Wietelmann, Ditzingen; Roland Karrelmeyer, Neckarsulm, both of Fed. Rep. of Germany

[73] Assignee: Robert Bosch GmbH, Stuttgart, Fed. Rep. of Germany

[21] Appl. No.: 966,614

[22] Filed: Oct. 26, 1992

Related U.S. Application Data

[63] Continuation of Ser. No. 654,788, Feb. 13, 1991, abandoned.

[30] Foreign Application Priority Data

Apr. 20, 1990 [DE] Fed. Rep. of Germany ....... 4012577

[51] Int. Cl.⁵ .............................................. F02D 31/00
[52] U.S. Cl. ..................................... 123/357; 123/358
[58] Field of Search ................. 123/357, 358, 359, 399

[56] References Cited

U.S. PATENT DOCUMENTS

| | | | |
|---|---|---|---|
| 3,722,485 | 3/1973 | Ohtani | 123/357 |
| 4,499,412 | 12/1985 | Locher et al. | |
| 4,520,779 | 6/1985 | Kubach | 123/357 |
| 4,538,571 | 9/1985 | Buck | 123/357 |
| 4,594,993 | 6/1986 | Engel et al. | |
| 4,653,447 | 3/1987 | Linder | 123/357 |
| 4,656,986 | 4/1987 | Kull | 123/357 |
| 4,667,633 | 5/1987 | Stumpp | 123/357 |
| 4,708,111 | 11/1987 | Shiozaki | 123/357 |

FOREIGN PATENT DOCUMENTS 2726987 6/1977 Fed. Rep. of Germany.

*Primary Examiner*—Carl S. Miller
*Attorney, Agent, or Firm*—Kenyon & Kenyon

[57] ABSTRACT

An automatic control system for a friction-encumbered signaling device (50) in a motor vehicle with the system including a first automatic controller (10) that compares an actual signaling-device position (UI) to a desired signaling-device position (US), with the first automatic controller being capable of calculating at least one input variable for the two-step action controller (40) that is connected to the load side of the first automatic controller, and the two-step action controller (40) including the capability for determining a variable hysteresis width E which is dependent upon system operating parameters.

11 Claims, 4 Drawing Sheets

AUTOMATIC CONTROL SYSTEM FOR A FRICTION-ENCUMBERED SIGNALING DEVICE IN A MOTOR VEHICLE

This is a continuation, of application Ser. No. 07/654,788, filed Feb. 13, 1991, entitled AUTOMATIC CONTROL SYSTEM FOR A FRICTION-ENCUMBERED SIGNALING DEVICE IN A MOTOR VEHICLE now abandoned.

FIELD OF THE INVENTION

The invention relates to an automatic control system for a friction-encumbered signaling-device of a motor vehicle.

BACKGROUND OF THE INVENTION

An automatic control system for friction-encumbered signaling-devices is disclosed by the German Published Patent Application 32 07 863 (which is a German counterpart to U.S. Pat. No. 4,499,412). The application also describes a regulating device for a friction-encumbered signaling-device. According to the application, the load side of a two-step action controller is connected to a non-linear automatic controller. This two-step action controller only switches from one step to the other when the difference between the setpoint value and the actual value of the closed-loop control circuit changes. At the balance point, the non-linear automatic controller shows a steep, yet normally flat characteristic curve. A limiting device suppresses the switching rates when they are too high. This prevents the two-step action controller from switching back and forth at a too frequent rate. The described system has an analog design.

The German Published Patent Application 32 33 290 (which is a German counterpart of U.S. Pat. No. 4,594,993) describes a device for automatically controlling the feedback rate of exhaust gas from a diesel engine. A linear automatic controller supplies the input variable to a three-step controller. According to the operation of the device, the three-step controller only switches when the difference between the setpoint value and the actual value of the closed-loop control circuit changes. Hysteresis prevents the three-step controller from constantly switching back and forth.

The German Published Patent Application 27 26 987 discloses splitting a regulating device into a digital and an analog component. The digital component processes the digital data, and the analog component processes the analog data.

SUMMARY OF THE INVENTION

The present invention is for reducing the influence of friction in an automatic control system in order to improve the dynamic performance of such a system.

According to the present invention, the hysteresis width E of a current regulator is made dependent upon certain system operating parameters which results in the operation of the automatic control system being improved considerably. More specifically, when the system of the invention is used, various hysteresis widths E may be established. These are dependent upon operating parameters, such as rotational frequency or the position of the signaling-device. This allows for the equalization of the affects of friction in the system without the signaling-device performing any intrinsic movement.

DETAILED DESCRIPTION OF THE INVENTION

The present invention is a system for improving the performance of automatic control systems used in motor vehicles that are influenced by friction associated with such automatic control systems. The system according to the present invention for descriptive purposes may be associated with a signaling-device for a diesel fuel pump. However, the system according to the present invention, may be associated with other friction-encumbered signaling-devices, in particular electro-magnetic actuators or throttle-valve final control elements.

Figure 1:
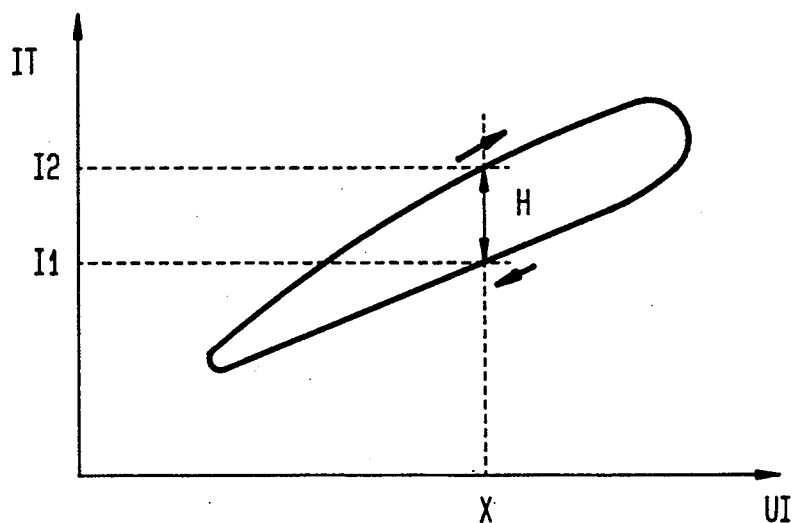
FIG. 1 is a graph which shows the correlation between the current that flows through a signaling-device and a position UI of the signaling-device.

The correlation between the current I which flows through the signaling-device and the position UI that the signaling-device assumes is plotted in FIG. 1. Friction-encumbered signaling-devices normally do not change their position when the actuating signal is slightly modified.

Referring to FIG. 1, if a signaling-device should occupy position X, then, according to previous history, this would require different currents I1 or I2. If the signaling-device is situated in position X with a signaling-device current I1 and the demand is made for its moving direction to change, then the signaling-device current must first be elevated to the value I2. The position of the final controlling element is not altered until the current changes by a minimum amount H. This minimum amount depends on various operating parameters. The parameters that determine the minimum amount H, for example, maybe the position of the signaling-device, fuel temperature, rotational frequency, or manufacturing tolerances.

Figure 2:
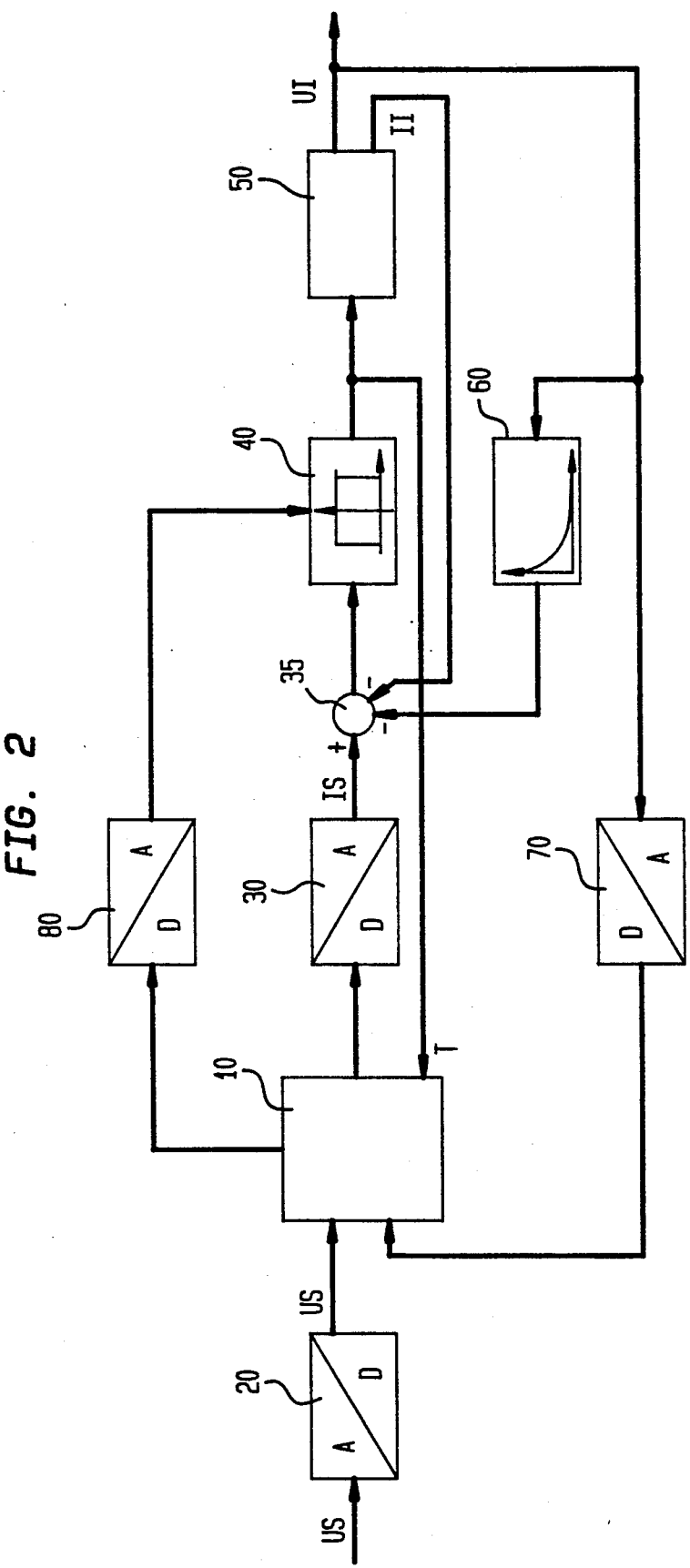
FIG. 2 is a schematic representation of the automatic control system that incorporates the present invention.

A schematic representation of the automatic control system of the present invention is shown in FIG. 2. The automatic controller 10 has two inputs. The first is signal UI input via the analog-digital converter 70. This is a feed-back signal that indicates the actual position of the regulating rod. The second signal is the signal US input via the analog-digital converter 20. This signal indicates the desired position of the regulating rod. From these signals and other data, the automatic controller 10 calculates a desired signaling-device current IS, which is supplied via a digital-to-analog converter 30 and a node 35 to a two-step action controller 40.

Based on other variables and the desired and measured cycle duration, T, the automatic controller 10 calculates the hysteresis width E of the two-step action controller 40. The hysteresis width E is input to the two-step action controller 40 via digital-to-analog converter 80. The output of the two-step action controller 40 is input to the signaling-device 50 for triggering it.

The actual current II measured at the signaling-device is fed back to the node 35. Furthermore, a signal UI pertaining to the actual position of the signaling-device is fed back to node 35 via an analog differentiating element 60 and, as stated, to automatic controller 10 via the analog-to-digital converter 70.

As shown in FIG. 2, the automatic controller 10 has a digital design and the remaining components, such as the two-step action controllers and the differentiating element 60, have analog designs. The digital automatic controller 10 has proven to be efficient.

To improve the stability of the closed-loop control circuit shown in FIG. 2, the actual position UI of the regulating rod is fed back via the differentiating element 60 to the input of the two-step action controller 40 through node 35. The differentiator 60 has an analog design and offers considerable advantages compared to digital differentiators that are incorporated into the automatic controller 10. This is due to the sampling time and the finite resolution of current analog-digital converters, and digital differentiators cannot attain the necessary approximation quality attained by analog differentiators.

As a function of the desired position US of the regulating rod, the actual position UI of the regulating rod, and other operating parameters, the digital automatic controller 10 specifies a current setpoint value IS and the hysteresis width E for the two-step action controller 40. The two-step action controller 40 controls the signaling-device dependent upon the comparison between the desired and the actual signaling-device current, as well as dependence upon the desired hysteresis width E. To this end, it either connects or interrupts the connection between the signaling-device 50 and the battery voltage.

If the two-step action controller 40 recognizes that the actual signaling-device current II is greater by the hysteresis width E than the desired signaling-device current IS, then it interrupts the connection to the battery voltage. If the actual signaling-device current II falls below the desired signaling-device current IS by hysteresis width E, then the two-step action controller 40 connects the battery voltage to the signaling-device.

Figure 5:
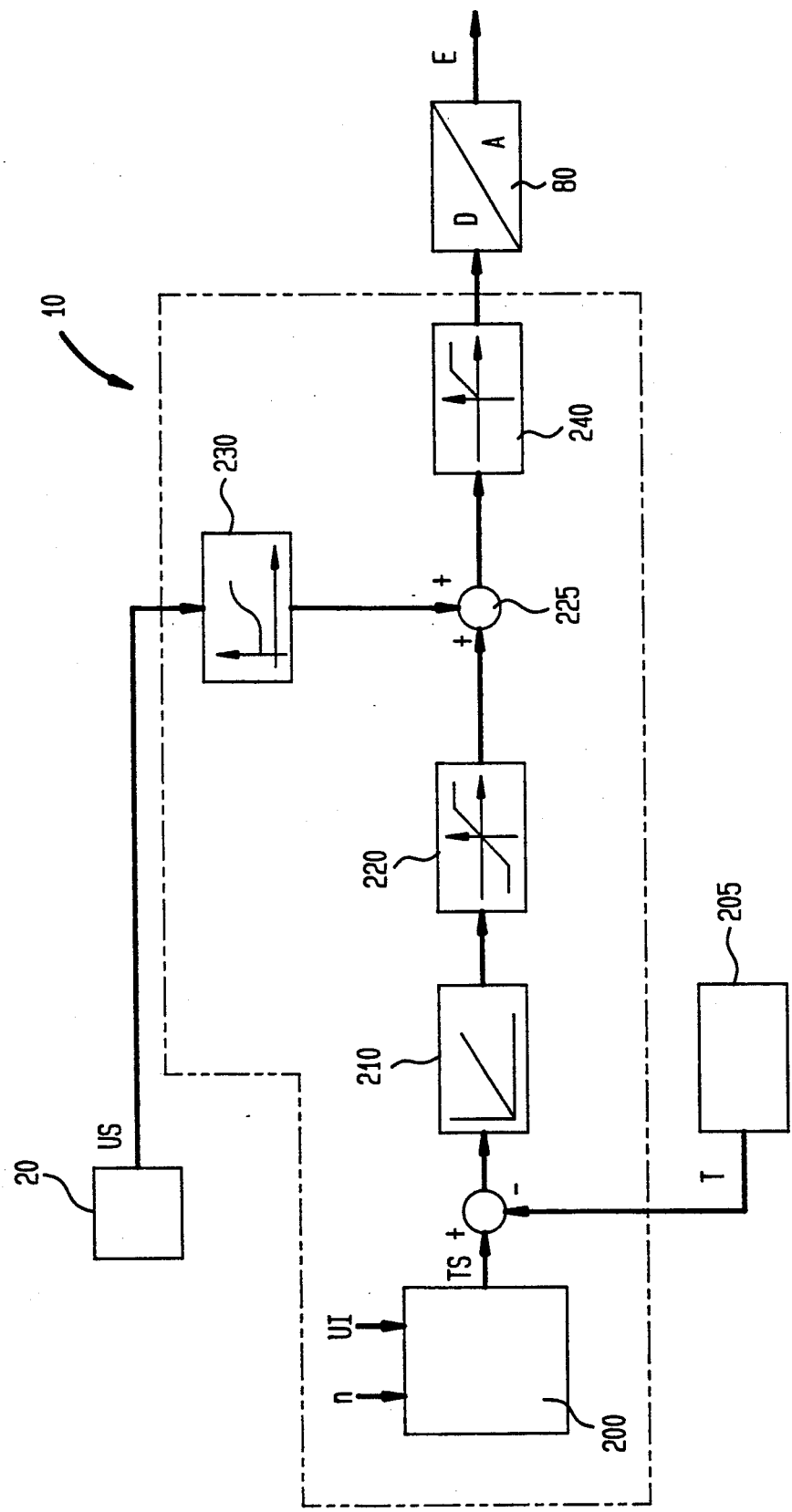

The respective circuit states of the two-step action controller are supplied to the automatic controller 10 to measure the cycle duration T. The measuring of the cycle duration can be incorporated in the automatic controller 10 or it can be a separate measuring element 205, as shown in FIG. 5.

Figure 3:
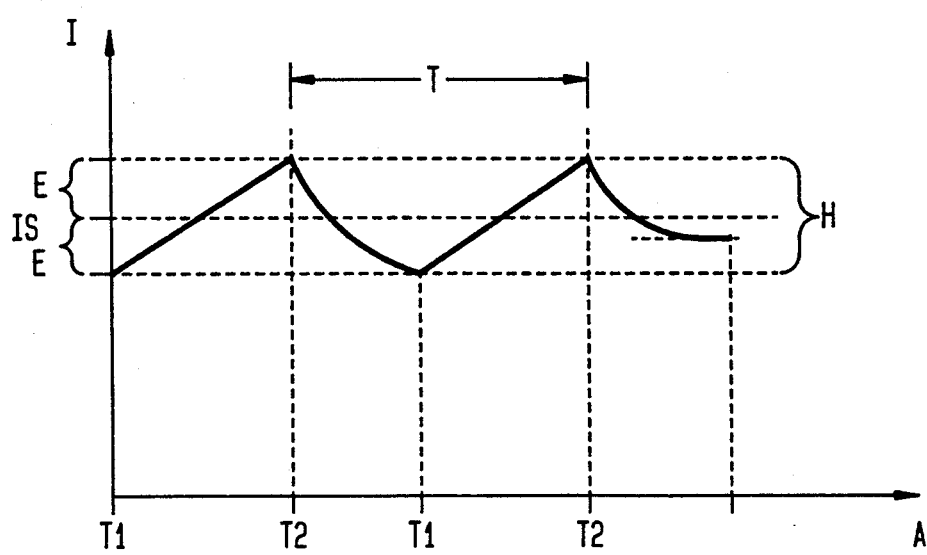
FIG. 3 is a graph of the current flowing through the signaling-device plotted against time.

The time characteristic of the signaling-device current is shown in FIG. 3. To this end, the actual signaling-device current II is plotted over time t. It has been found particularly advantageous for the hysteresis width E to be one half of the minimum amount H.

Referring to FIG. 3, at the instant T1, the actual signaling-device current II is smaller by the hysteresis width E than the desired signaling-device current IS. At this instant, the signaling-device 50 is connected up to the battery voltage; as a result the actual signaling-device II current rises. At the instant T2, the actual signaling-device II current is greater by the hysteresis width E than the desired signalling-device current IS. At this instant, the connection between the signaling-device and the battery voltage is interrupted. The result is that the actual signaling-device current II falls off again, until it again lies below the desired value IS by the hysteresis width E. As is shown, the value of the actual signaling-device current II constantly fluctuates between a value which lies above and below the desired signaling-device current by the hysteresis width E.

Through an appropriate setpoint selection of the hysteresis width E, the actual signaling-device current II can be made to fluctuate back and forth between two current values. Therefore, the two-step action controller continuously switches back and forth between the two states. The switching time can be controlled by specifying the hysteresis width E. The switching time is set so that when the desired signaling-device current IS changes, the signaling-device reacts very quickly. When there is a constant, desired signaling-device current IS, the signaling-device does not perform any intrinsic movements.

Figure 4:
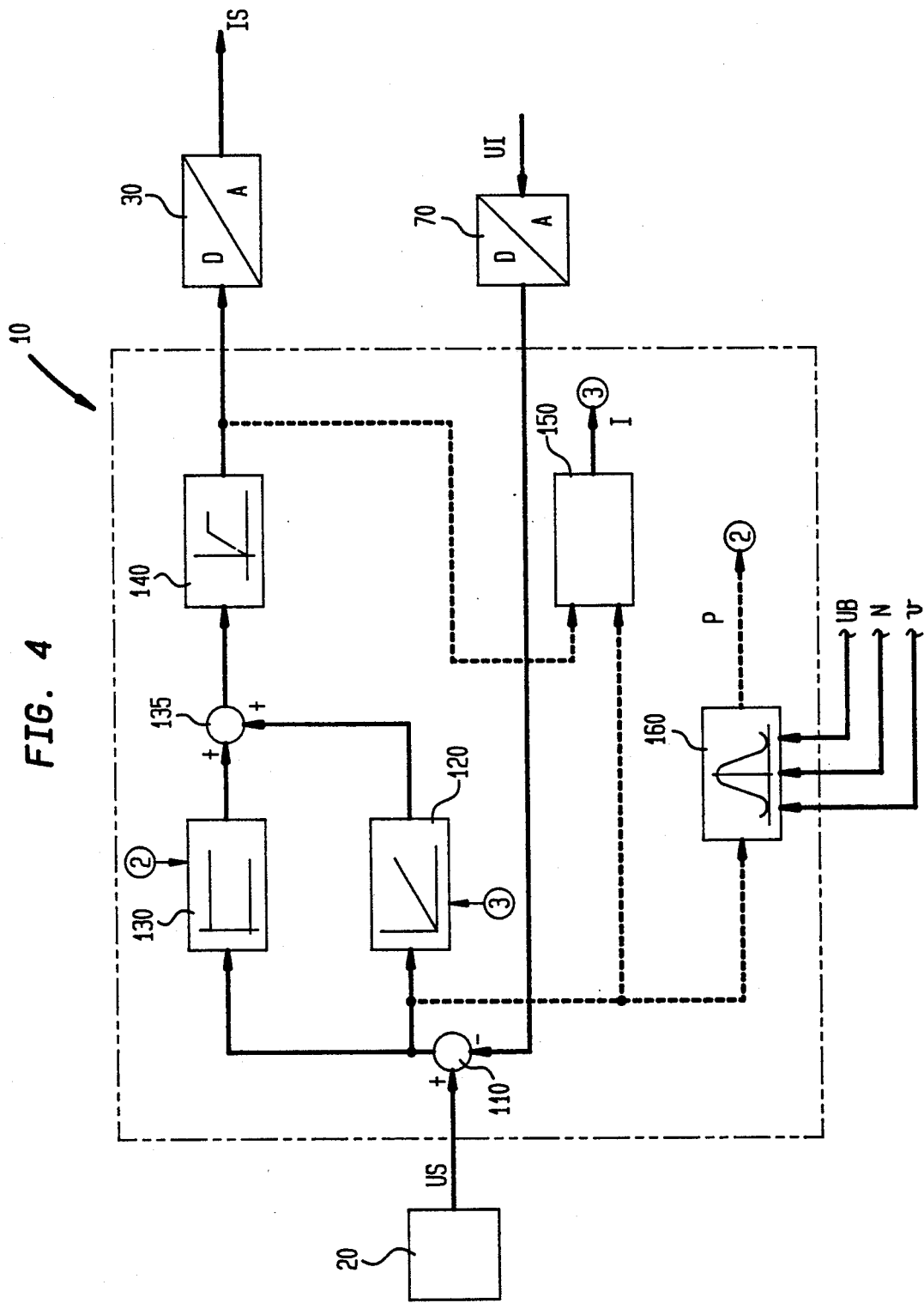
FIGS. 4 and 5 show detailed schematic drawings of the automatic controller.

FIG. 4 shows the portion of the automatic controller 10, referred to as the position controller, which calculates the setpoint value, for the signaling-device current IS. The desired position US of the regulating rod and the actual position UI of the regulating rod are input to reference point 110 via the analog-digital converter 20 and the analog-digital converter 70, respectively. The difference between these two signals is input an integrator 120 and at a proportional element 130. Points 2 and 3, respectively, are inputs for the proportionality constant P and the integrator's regulated quantity.

The output signals from the proportional element 130 and the integrator 120 are input to a limiter 140 via the summing point 135. The output signal from the limiter 140 represents the output signal from the automatic controller 10 which is fed to the digital-to-analog converter 30.

The signal output from the limiter 140 and the signal output from the differential stage 110 are input to the a block 150. The signal output from the block 150, as indicated by point 3, is input to the integrator 120.

Various operating parameters and the output differential stage 110 are input to a block 160. The signal output from the block 160, as indicated by point 2, is input the proportional element 130.

Depending upon the difference between the desired position US and the actual position UI of the regulating rod, both the integrator 120 and the proportional element 130 generate an output signal which is input to summing point 135. These output signals are added at the summing point 135 with the output of summary point 135 being input to limiter 140.

Two blocks 120, 130 work as an automatic controller with at least proportional-plus-integral action. The signal output from the automatic controller 120, 130 is restricted in the limiter 140 to a maximum value. The output signal from the limiter is converted in the digital-to-analog converter into a signal which represents the desired signaling-device current IS.

Also, in accordance with the present invention, the block 150 improves the control performance of the automatic controller 120, 130. The block 150 features an anti-reset-windup function. The signal output from the limiter 140 and the system deviation signal from differential stage 110 are fed to a block 150. If the signal output from the automatic controller 120, 130 exceeds a predetermined limit, the signal is restricted by the limiter 140. In doing this, the value of the integrator will be frozen. In freezing the value of the integrator 120, such value is stored and is no longer increased until the output signal from the automatic controller again falls below the predetermined limit.

If the value of the integrator is not frozen, as stated, and if the system deviation signal from differential stage 110 is applied over a longer period of time, then the value of the integrator could assume very high values. If the (plus or minus) sign of the system deviation then changes from plus to minus, or minus to plus, the automatic controller would require a considerable amount of time until the value of the integrator is again reduced. Hence, the block 150 improves the control performance of the automatic controller by controlling the value of the signal output from summary point 135 via integrator 120. If, in addition, the system deviation signal from differential stage 110 is available to the block 150, then the integrator begins to work immediately after there is a change in the (plus or minus) sign of the system deviation.

Another aspect of the present is the use of the block 160. The proportionality constant P output from the block 160 to input to the proportional element 130. The generation of the proportionality constant P is dependent upon one or more of the variables system deviation, battery voltage, rotational frequency, or fuel temperature.

It has been determined that it is very beneficial to have the proportionality constant P with a greater value in cases when system deviations are small rather than large. When there are a low battery voltages and/or at low temperatures, it is beneficial to have a large proportionality constant P. On the other hand, a small proportionality constant P is advantageous when the rotational frequency is high.

FIG. 5 gives the details of the portion of the automatic controller 10, referred to as the period controller, which calculates the hysteresis width E for the two-step action controller. Depending upon operating parameters, such as rotational frequency and the position UI or US of the regulating rod, the setpoint-value calculation block 200 provides at its output, a value TS for the cycle duration. This desired value for the cycle duration TS is compared to the actual value of the cycle duration T. The difference between these two signals is fed to the period element 210. The signal output is input to first limiter 220 which controls a lower and an upper limit of the signal.

The inputs to the summing point 225 are the output signal from a precontrol family of characteristics 230 and the output of the first limiter 22. These two signals are added at summary point 225. The sum of the two signals is limited by a second limiter 240. The signal output from second limiter 240 represents the hysteresis width E, which is input to the two-step action controller 40 via the digital-to-analog converter 80 (see FIG. 2).

The period element 210 calculates the value for the hysteresis width E dependent upon the comparison between the desired value for the cycle duration TS and the actual cycle duration T. Since this value should be greater than a predetermined minimum value, but less than a predetermined maximum value, the limiter 220 restricts the signal output from the period element 210 to a specific range of values.

The precontrol family of characteristics 230 ensures an immediate response to rapid changes in the position of the regulating rod. Values for the hysteresis width E are input to the precontrol family of characteristics dependent upon the operating parameters. Hence, in cases of heavy friction, a large hysteresis width E is needed to overcome the frictional forces. A large hysteresis width E necessitates a long cycle duration T. In cases of light friction, only a small hysteresis width E is needed to overcome the frictional forces. If a large hysteresis width is applied here, this would cause the signaling-device to execute intrinsic movements.

The friction, among other things, depends on the position of the signaling-device. Therefore, the hysteresis width E that is input to the precontrol family of characteristics 230 is at least dependent upon the magnitude of this position change of the signaling-device. In the case of large position changes of the signaling-device, the friction is usually high, so that a large hysteresis width E is needed. On the other hand, a small position change means that only a small hysteresis width E is needed. When the position of the signaling-device changes rapidly, the new value for the hysteresis width E becomes immediately available at the output of the second limiter 240 via family of characteristics 230.

In a simplified specific embodiment of the system according to the invention, one dispenses with the measurement of the cycle duration. In this case, the hysteresis width E is read out of a precontrol family of characteristics 230 as a function of different operating parameters. To this end, a modified precontrol family of characteristics 230 is used in which the hysteresis width E is generated dependent upon the signaling-device position, the rotational frequency and other variables. This type of system can be realized very simply.

The described period controller is advantageous for friction-encumbered signaling-devices. This is particularly so when the friction exhibits different values at different operating points and different operating states.

We claim:

1. An automatic control system for a friction-encumbered signaling-device (50) in a motor vehicle, comprising:
   a first automatic controller (10) for comparing a first variable indicative of an actual signaling-device position (UI) and a second variable indicative of a desired signaling-device position (US), and calculating at least one input variable for a two-step action controller (40); and
   the two-step action controller (40) connected to a load side of the first automatic controller (10), with the two-step-action controller (40) having a variable hysteresis width E that is controlled by the first automatic controller (10) dependent upon predetermined operating parameters, with there being a selectable hysteresis width for each set of operating parameters.

2. An automatic control system for a friction-encumbered signaling-device (50) in a motor vehicle, comprising:
   a first automatic controller (10) for comparing a first variable indicative of an actual signaling-device position (UI) and a second variable indicative of a desired signaling-device position (US), and calculating at least one input variable for a two-step action controller (40); and
   the two-step action controller (40) connected to a load side of the first automatic controller (10), with the two-step action controller (40) having a variable hysteresis width E that is controlled by the first automatic controller (10) dependent upon predetermined operating parameters, with there being a selectable hysteresis width for each set of operating parameters, the variable hysteresis width E for controlling continuous switching of the two-step action controller.

3. An automatic control system for a friction-encumbered signaling-device (50) in a motor vehicle, comprising:

a first automatic controller (10) for comparing a first variable indicative of an actual signaling-device position (UI) and a second variable indicative of a desired signaling-device position (US), and calculating a third variable indicative of the desired signaling-device current (IS) that is input to a two-step action controller (40); and the two-step action controller (40) connected to a load side of the first automatic controller (10) for combining at least the third variable indicative of a desired signaling-device current (IS), a fourth variable indicative of an actual signaling-device current (II) output from the signaling-device (50), and a differentiated fifth variable indicative of the actual signaling-device position (UI) to generate a sixth variable indicative of a combined value of the third, fourth, and differentiated fifth variables, with the two-step action controller (40) having a seventh variable indicative of a hysteresis width E input thereto that is controlled by system operating parameters, the seventh variable for controlling continuous switching the fourth variable between two predetermined levels.

4. The automatic control system according to claim 1, 2 or 3, wherein the first automatic controller is a digital first automatic controller, and further includes a position controller and period controller.

5. The automatic control system according to claim 1 or 2, wherein the position controller generates an output that is a current setpoint value which is input to the two-step action controller.

6. The automatic control system according to claim 1, 2 or 3, wherein the system operating parameters include at least one the parameters system deviation between actual and desired position current, battery voltage, rotational frequency, or fuel temperature which modify control parameters of the position controller.

7. The automatic control system according to claim 1, 2 or 3, wherein the period controller provides an output that is the hysteresis width E.

8. The automatic control system according to claim 7, wherein the period controller includes an integrating function and a limiting function from processing signals input thereto.

9. The automatic control system according to claim 7, wherein the period controller further includes a precontroller for modifying the hysteresis width E in accordance with the position of the signaling-device.

10. The automatic control system according to claim 9, wherein the signaling-device position is an input to the two-step action controller.

11. The automatic control system according to claim 3, wherein the position controller generates the third variable that is a current set point value indicative of the desired signaling-device current (IS) which is input to the two-step action controller.

* * * * *